UNITED STATES PATENT OFFICE.

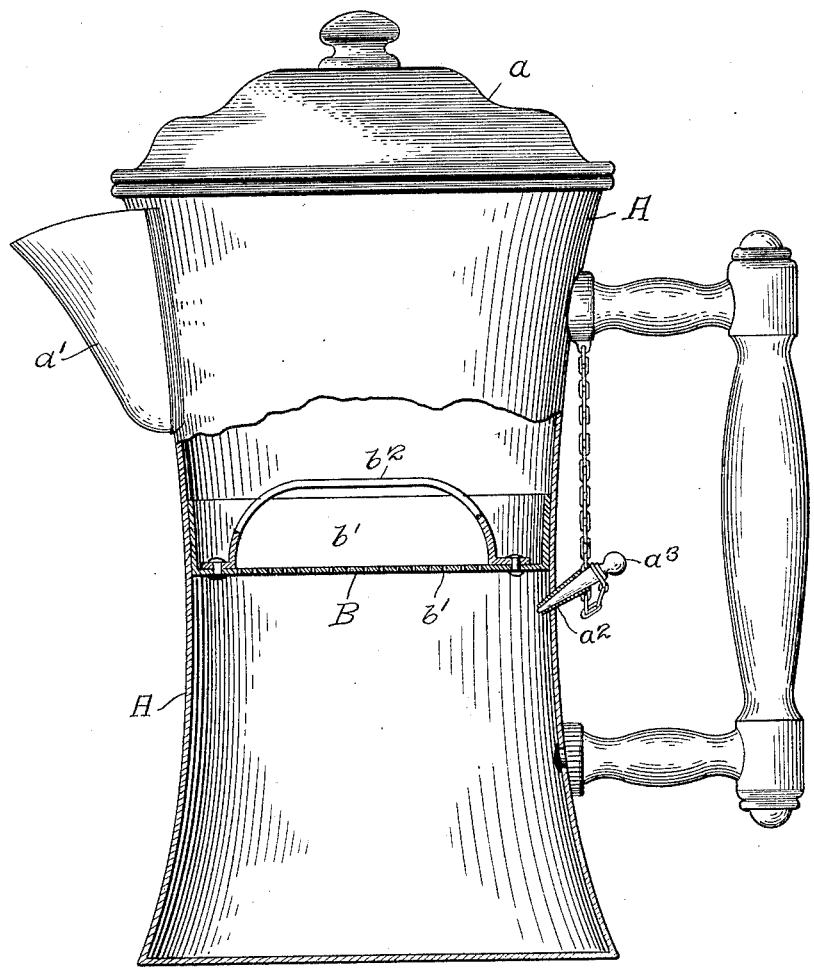

HUBERT GALT, OF CHICAGO, ILLINOIS.

POT FOR COFFEE, &c.

1,097,711.     Specification of Letters Patent.     Patented May 26, 1914.

Application filed April 7, 1913. Serial No. 759,535.

*To all whom it may concern:*

Be it known that I, HUBERT GALT, a citizen of the Dominion of Canada, residing at Chicago, in the county of Cook and State of Illinois, have invented certain new and useful Improvements in Pots for Coffee, &c., of which the following is a specification, reference being had therein to the accompanying drawing.

My invention relates to pots primarily intended for making coffee and tea and its object is to provide a simple device by which tea or coffee can be made off the stove or other heater and having a removable screen forming an air tight joint with the pot and upon which the tea leaves or ground coffee are supported at approximately the middle of the pot, a spout above the screen, and a vent valve whereby the lower portion of the pot below the screen is sealed or closed to form an air cushion to retain the boiling water on the material on the screen to steep the material while the valve is closed and to allow the water to descend to the lower portion of the pot when the valve is opened after the coffee or tea is made.

The invention consists in the matters hereinafter described and then pointed out in the appended claims.

In the accompanying drawing the figure is a central vertical sectional view of a pot embodying my invention, and the reference letter A indicates a coffee or tea pot provided with a removable cover $a$ and having its interior cross-sectional area or diameter reduced at approximately its middle portion and below the spout $a'$, this conformation being obtained preferably by inwardly inclining the inner wall from the top toward the center of the pot as shown in the drawing.

The reference letter B indicates a removable screen having a perforated or reticulated bottom $b$ and an upwardly directed slightly flared body $b'$ having a handle $b^2$ and an outer cross-sectional area or diameter substantially equal to the inner diameter of the pot at approximately its central point, the configuration and size of these parts being such that the body of the screen fits with and makes a substantially air tight joint with the inner wall or face of the pot when the screen is placed in position in the pot below the discharge spout $a'$. This screen divides the pot into upper and lower chambers, the upper chamber being provided with the discharge opening with which the spout communicates and the lower chamber being provided with a vent-opening $a^2$ below the line of the screen and preferably near the screen by which the lower chamber is placed in communication with the outer air. The spout or its discharge-opening is not sealed or closed, but the vent-opening is provided with a valve to open and close it. In the form shown the valve is in the form of a tapered pin $a^3$ which when inserted in the opening frictionally engages the wall to seal the opening and when withdrawn in whole or in part allows air to pass out of the lower chamber under the weight of the body of water in the upper chamber.

In the use of my invention the screen is loaded with the desired amount of tea leaves or ground coffee and the vent is closed by seating the valve in the opening, when boiling water is poured into the pot on the material on the screen, usually in sufficient quantity to fill the upper chamber. The pot being of small diameter the small area of the screen permits the water to cover its face before any water passes through the screen and its layer of tea leaves or coffee grounds, and the air confined in the lower chamber will hold the water in the upper chamber upon the material on the screen where it acts to steep or boil the tea or coffee, and when this action is completed the valve is opened to allow the air in the lower chamber to pass out through the vent-opening when the completed tea or coffee will run through the screen into the lower chamber. The vent is preferably placed at such point that the completed tea or coffee in the lower chamber will not leak out through it even if the valve be left open. After the screen is removed the vent may be closed and the upper chamber may then be refilled with water if the amount of material steeped is sufficient to make such quantity of completed tea or coffee, whereby the full capacity of the pot may be obtained by using only the single vessel.

By my invention the tea or coffee is prepared without placing the pot on the stove or other heater.

While my invention is primarily intended for making coffee and tea it may be employed for steeping or treating other materials. The form and location of the vent-opening into the lower chamber and of its valve may be varied. The location of the discharge-opening in the upper chamber is essential in the present invention as this permits me to make the lower chamber practically air tight by means of the loaded screen and water in the upper chamber without providing any plug or seal for the discharge-opening or its spout.

I claim:—

1. A pot having an inner removable screen forming an air tight joint with the pot at or near its middle portion to provide an upper boiling chamber and a lower air-chamber, the air-chamber having a vent-opening below the screen, a valve to open and close the vent-opening to control the seal of the air-chamber after the screen is covered with water in the upper chamber, and an open spout communicating with the upper chamber.

2. A pot having an inner removable screen forming an air tight joint with the pot at or near its middle portion to provide an upper boiling chamber and a lower air-chamber, the lower chamber having a vent-opening below the screen and the upper chamber having a discharge-opening above the screen, a tapered pin to open and close the vent-opening to control the seal of the air-chamber when the screen is covered with water in the upper chamber, and an open spout for the discharge-opening.

In testimony whereof I affix my signature in presence of two witnesses.

HUBERT GALT.

Witnesses:
  EDITH WILCOX,
  J. McROBERTS.

---

Copies of this patent may be obtained for five cents each, by addressing the "Commissioner of Patents, Washington, D. C."